United States Patent [19]

Hassan et al.

[11] Patent Number: 5,722,049
[45] Date of Patent: Feb. 24, 1998

[54] MOBILE-LINK SYSTEM FOR A RADIO COMMUNICATION SYSTEM WHEREIN DIVERSITY COMBINING IS PERFORMED ONLY FOR EDGE/BOUNDARY ZONE SIGNALS AND NOT FOR CENTRAL ZONE SIGNALS

[75] Inventors: Amer Aref Hassan; Barbara Davis Molnar, both of Cary, N.C.; Eric Stasik, Stockholm, Sweden

[73] Assignee: Ericsson Inc., Research Triangle Park, N.C.

[21] Appl. No.: 567,513

[22] Filed: Dec. 5, 1995

[51] Int. Cl.$^6$ .......................... H04B 1/00; H04B 17/02; H04B 7/185; H04B 1/60

[52] U.S. Cl. ...................... 455/54.1; 455/137; 455/12.1; 455/10

[58] Field of Search .................................. 455/137, 13.3, 455/25, 273, 12.1, 13.1–13.4, 52.1, 33.1, 33.4, 8, 54.1, 10; 370/316–326; 375/347

[56] References Cited

U.S. PATENT DOCUMENTS

| | | | |
|---|---|---|---|
| 3,810,255 | 5/1974 | Wachs et al. | 325/3 |
| 4,228,401 | 10/1980 | Wachs et al. | 455/12 |
| 4,232,266 | 11/1980 | Acampora | 370/79 |
| 4,287,598 | 9/1981 | Langseth et al. | 455/52 |
| 4,361,905 | 11/1982 | Etherington et al. | 455/80 |
| 4,498,885 | 2/1985 | Namiki | 455/273 |
| 4,512,034 | 4/1985 | Greenstein et al. | 455/139 |
| 4,519,096 | 5/1985 | Cerny, Jr. | 455/137 |
| 4,628,506 | 12/1986 | Sperlich | 370/104 |
| 4,742,563 | 5/1988 | Fukumura | 455/132 |
| 4,918,684 | 4/1990 | Boschet et al. | 370/17 |
| 5,109,536 | 4/1992 | Kommrusch | 455/82 |
| 5,134,417 | 7/1992 | Thompson | 342/375 |
| 5,204,981 | 4/1993 | Karasawa et al. | 455/277.1 |
| 5,552,798 | 9/1996 | Dietrich et al. | 343/893 |
| 5,553,069 | 9/1996 | Ueno et al. | 370/75 |
| 5,592,481 | 1/1997 | Wiedman et al. | 370/316 |
| 5,602,833 | 2/1997 | Zehavi | 370/209 |
| 5,631,898 | 5/1997 | Dent | 370/203 |

FOREIGN PATENT DOCUMENTS 4322863  1/1995  Germany .......................... H04B 7/26

Primary Examiner—Tommy P. Chin
Assistant Examiner—David R. Vincent
Attorney, Agent, or Firm—David G. Matthews

[57] ABSTRACT

A mobile-link system for a radio communication system including a first mobile-link assembly, a second mobile-link assembly, and a satellite feeder-link assembly located in a satellite; and an earth feeder-link assembly located in an earth station. The first mobile-link assembly receives mobile uplink signals including zone-one uplink signals transmitted from mobile stations located in a first zone of a coverage area and zone-two uplink signals transmitted from mobile stations located in a second zone of the coverage area, and outputs received zone-one uplink signals and received zone-two uplink signals. The second mobile-link assembly receives mobile uplink signals transmitted from mobile stations in the coverage area, and outputs received zone-two uplink signals and not zone-one uplink signals. The second mobile link assembly also transmits mobile downlink signals to at least the first and second zones of the coverage area. The satellite feeder-link assembly conveys the received mobile uplink signals to the earth feeder-link assembly by transmitting feeder-link downlink signals corresponding to the received mobile uplink signals. The earth feeder-link assembly is connected to and couples the mobile-link system to a communication network. The earth feeder-link assembly includes a combiner for combining the feeder-link downlink signals such that the zone-two uplink signals received by the first and second mobile link assemblies are combined to produce diversity resultant signals.

21 Claims, 7 Drawing Sheets

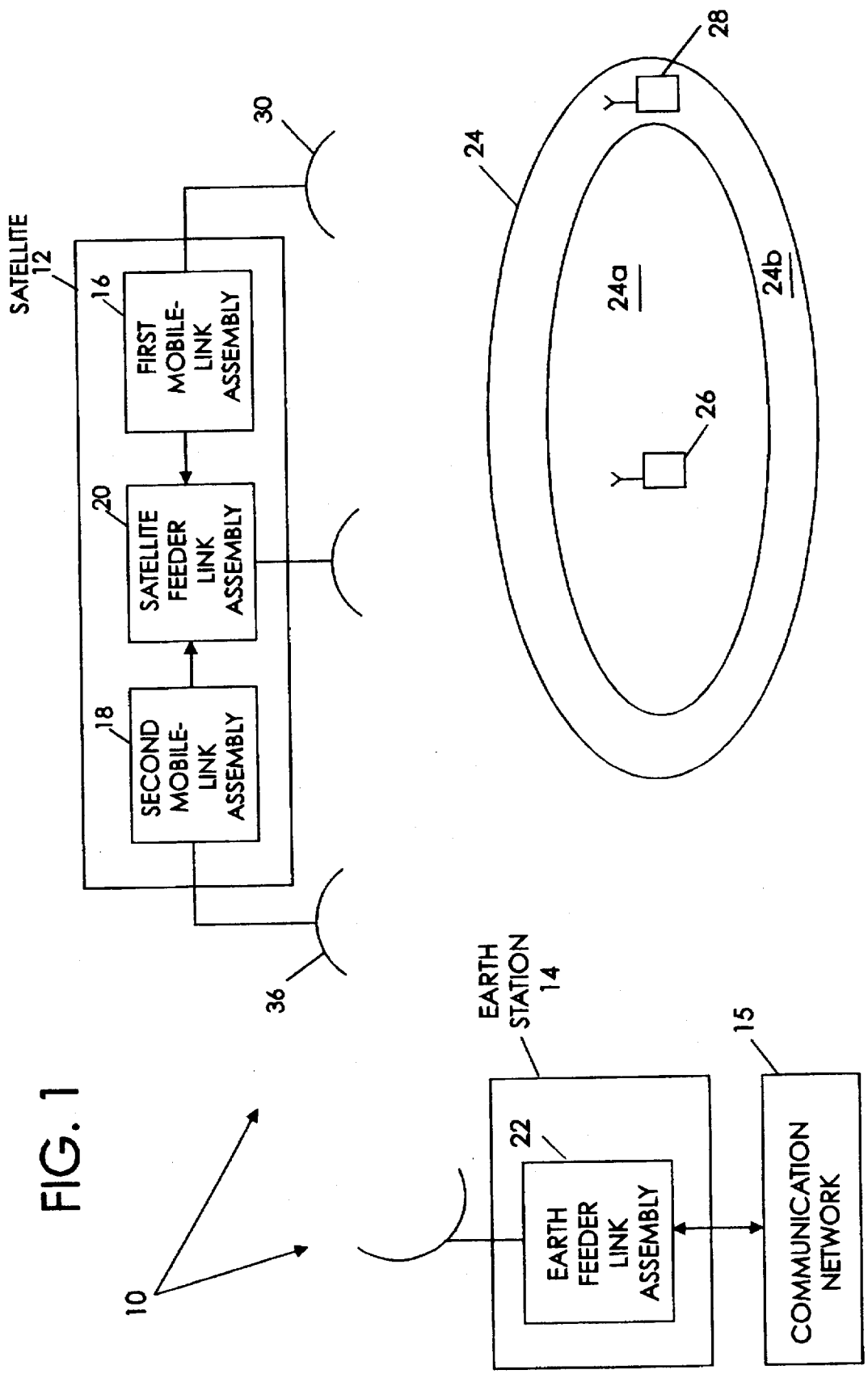

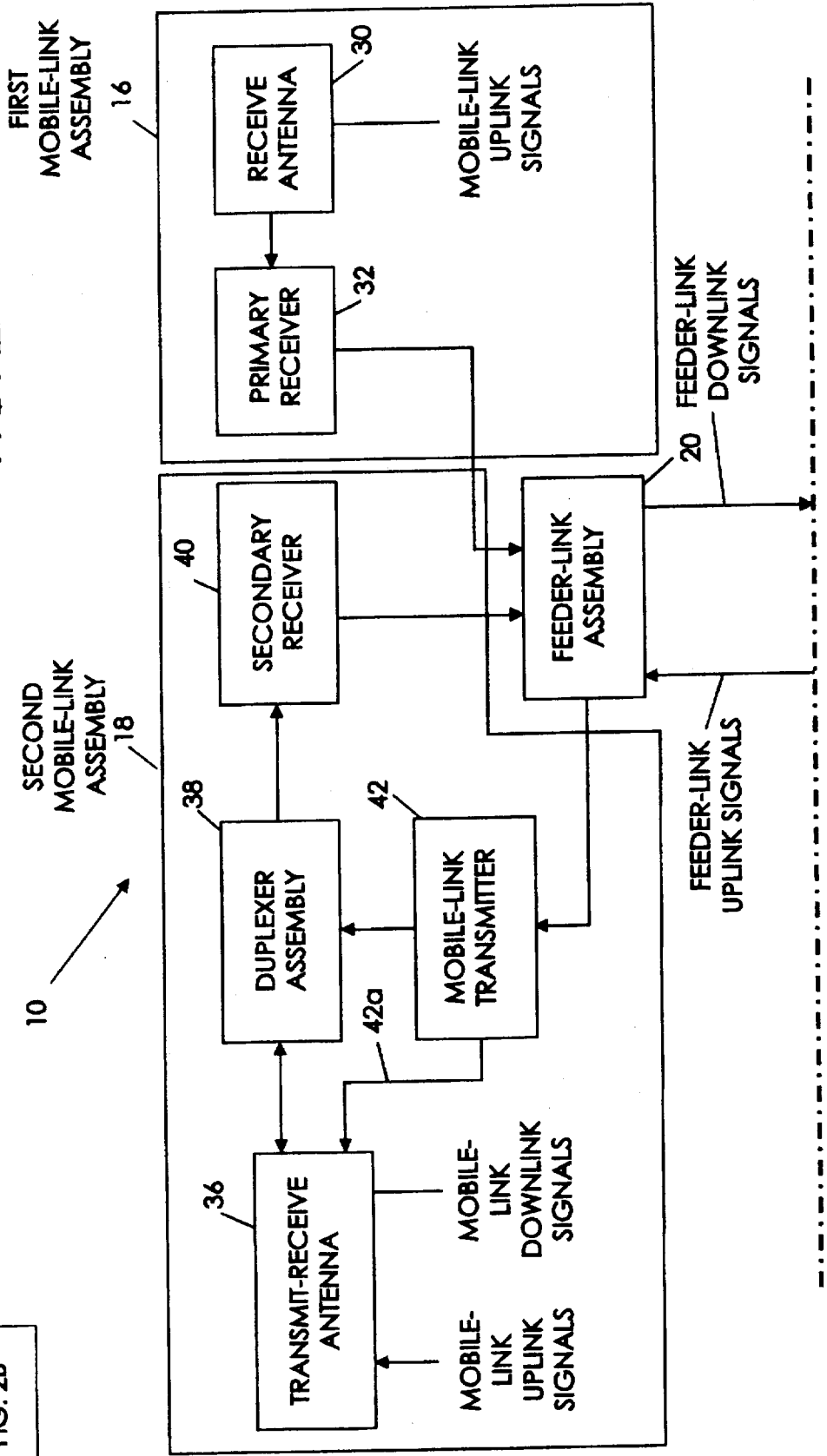

MOBILE-LINK SYSTEM FOR A RADIO COMMUNICATION SYSTEM WHEREIN DIVERSITY COMBINING IS PERFORMED ONLY FOR EDGE/BOUNDARY ZONE SIGNALS AND NOT FOR CENTRAL ZONE SIGNALS

FIELD OF THE INVENTION

The present invention relates generally to mobile-link systems for radio communication systems, and more particularly to mobile-link systems providing for diversity reception of uplink signals transmitted by mobile stations.

BACKGROUND OF THE INVENTION

A mobile-link system for a radio communication system functions to create communication links between a base station and mobile stations located in a coverage area of the base station. To create the communication links, the mobile-link system includes one or more mobile-link assemblies with each mobile-link assembly transmitting downlink signals to mobile stations located in the coverage area or receiving uplink signals from mobile stations located in the coverage area. In the prior art, a mobile-link system often included two or more mobile-link assemblies for receiving uplink signals from the mobile stations and a different mobile-link assembly for transmitting downlink signals to mobile stations in the coverage area.

The use of two or more mobile-link assemblies for receiving uplink signals is known as diversity reception. A mobile-link system using diversity reception combines the uplink signals received at different mobile-link assemblies to produce diversity uplink signals. Because the diversity uplink signals are formed using a combination of uplink signals, the diversity uplink signals tend to more accurately correspond to the uplink signals transmitted by the mobile stations. In the prior art, diversity reception for the coverage area was typically provided by using an additional mobile-link assembly for receiving uplink signals. The addition of a mobile-link assembly to the base station increases the cost, complexity, weight, and power requirements of the mobile-link system.

These problems associated with use of an additional mobile-link assembly for diversity reception are increased when the base station and associated mobile-link system is satellite based. Weight, complexity, and power requirements are critical factors for satellites and additional mobile-link assemblies or other components used for diversity reception negatively impact all these factors. A mobile-link system is needed that provides for diversity reception and minimizes the above discussed problems.

SUMMARY OF THE INVENTION

A mobile-link system for a radio communication system including a first mobile-link assembly, a second mobile-link assembly, and a satellite feeder-link assembly located in a satellite; and an earth feeder-link assembly located in an earth station. The first and second mobile-link assemblies together provide for transmission of mobile downlink signals and reception of mobile uplink signals for both a first and second zone of a coverage area, and provide diversity reception for the second zone in the coverage area. In the preferred embodiments, the first zone is a central zone and the second zone is an edge zone.

The first mobile-link assembly receives mobile uplink signals including zone-one uplink signals transmitted from mobile stations located in a first zone of a coverage area and zone-two uplink signals transmitted from mobile stations located in a second zone of the coverage area, and outputs to the satellite feeder-link assembly received zone-one uplink signals and received zone-two uplink signals. The second mobile-link assembly receives mobile uplink signals transmitted from mobile stations in the coverage area, and outputs to the satellite feeder-link assembly received zone-two uplink signals and not zone-one uplink signals. The second mobile link assembly also transmits mobile downlink signals to at least the first and second zones of the coverage area.

The satellite feeder-link assembly conveys the received mobile uplink signals to the earth feeder-link assembly by transmitting feeder-link downlink signals corresponding to the received mobile uplink signals. The earth feeder-link assembly is connected to and couples the mobile-link system to a communication network. The earth feeder-link assembly includes a combiner for combining the feeder-link downlink signals such that the zone-two uplink signals received by the first and second mobile link assemblies are combined to produce diversity resultant signals.

Accordingly, it is an object of the present invention to provide a mobile-link system having a first and second mobile-link assembly that together provide coverage for a first and second zone of a coverage area and diversity reception for only the second zone.

Another object of the present invention is to combine received zone-two uplink signals at the earth feeder-link assembly.

Another object of the present invention is to minimize the components required for the satellite, and to minimize the weight and complexity of the satellite.

These and other objects of the invention, together with features and advantages therefore, will become apparent from the following detailed specification when read with the accompanying drawings in which like reference numerals refer to like elements.

BRIEF DESCRIPTION OF THE DRAWINGS

FIG. 1 shows a mobile-link system and its associated coverage area according to the present invention.

DETAILED DESCRIPTION OF THE PREFERRED EMBODIMENTS

Figure 2B:
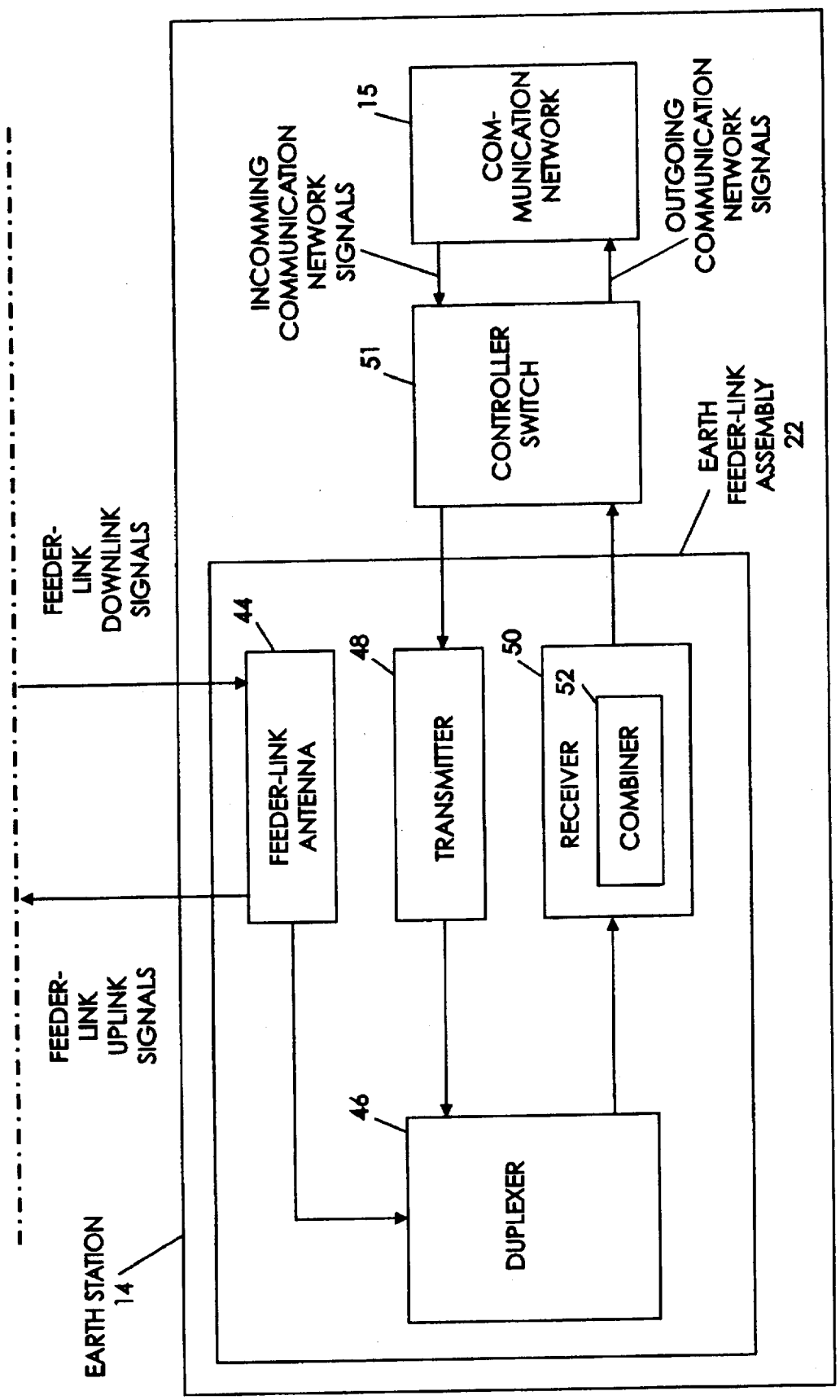
FIG. 2, constructed of FIG. 2A and FIG. 2B, is a general block diagram of a mobile-link system according to the present invention.

Referring now to the drawings, a mobile-link system according to the present invention is shown and indicated generally by the numeral 10. Mobile-link system 10 functions to create communication links between a base station and mobile stations located in a coverage area of the base station. The base station is connected to a public switch telephone network (PSTN) or other communication network such that the mobile stations in the coverage area can be linked to other communication devices in the communication network. In the preferred embodiment to be described, the base station and its mobile-link system are satellite-based. A mobile-link system according to the present invention could also be implemented in a land-based base station.

Turning to FIG. 1, mobile-link system 10 is based in a satellite 12 and earth station 14, and links mobile stations in a coverage area 24 to a communication network 15. The coverage area 24 for the mobile-link system 10 includes a central zone 24a and an edge zone 24b. The edge zone 24b is located along the periphery of the coverage area 24 and the central zone 24a is located in a central area of the coverage area 24. FIG. 1 shows a first mobile station 26 located in the central zone 24a and a second mobile station 28 located in the edge zone 24b. The central zone 24a and edge zone 24b are determined based on the relative strength of the communication links provided to the coverage area 24. The mobile links between the mobile stations in the central zone 24a and the mobile-link system 10 are generally stronger than the mobile links between the mobile stations in the edge zone 24b and the mobile-link system 10. The generally stronger communication links for mobile stations in the central area 24a are due primarily to the relatively shorter distance between mobile stations in the central zone 24a and satellite 12, and the relatively smaller impact of shadowing on the mobile stations in the central zone 24a.

The mobile-link system 10 includes a first mobile-link assembly 16, a second mobile-link assembly 18, and a satellite feeder-link assembly 20 located on satellite 12; and an earth feeder-link assembly 22 located in earth station 14. The first mobile-link assembly 16 and second mobile-link assembly 18 together operate to transmit mobile downlink signals from satellite 12 and receive mobile uplink signals from mobile stations located in the central zone 24a and edge zone 24b of coverage area 24. In the specification and claims, mobile downlink signals transmitted to central zone 24a will be referred to as central downlink signals and mobile downlink signals transmitted to edge zone 24b will be referred to as edge downlink signals. Likewise, mobile uplink signals transmitted by mobile stations from central zone 24a will be referred to as central uplink signals and mobile uplink signals transmitted from edge zone 24b will be referred to as edge uplink signals.

The satellite feeder-link assembly 20 and earth feeder-link assembly 22 operate to form a feeder-link between the satellite 12 and earth station 14. The feeder-link created by feeder-link assemblies 20 and 22 allow mobile stations in the coverage area 24 to be linked with communication network 15. For example, the earth station 14 can be connected to a public switch telephone network (PSTN) enabling mobile stations in the coverage area 24 to communicate with telephones and other communication devices in a communication network connected to the PSTN.

The first mobile-link assembly 16 and second mobile-link assembly 18 of mobile-link system 10 operate in combination to transmit downlink signals to and receive uplink signals from mobile stations located both in the central zone 24a and edge zone 24b. In addition, the first mobile-link assembly 16 and second mobile-link assembly 18 provide diversity reception of edge uplink signals transmitted from mobile stations located in the edge zone 24b. Diversity reception is not provided for central uplink signals transmitted from mobile stations located in the central zone 24a.

More specifically, the second mobile-link assembly 18 transmits downlink signals to both the central zone 24a and the edge zone 24b, and receives uplink signals from the edge zone 24b. The first mobile-link assembly 16 receives uplink signals from both the central zone 24a and the edge zone 24b. Accordingly, an uplink signal transmitted by a mobile station in edge zone 24b will be received at both the first mobile-link assembly 16 and second mobile-link assembly 18.

As discussed in more detail below, the edge uplink signals received by the first mobile-link assembly 16 and second mobile-link assembly 18 are combined to provide diversity reception for uplink signals transmitted from the edge zone 24b. Diversity reception is provided for edge uplink signals and not central uplink signals because the edge uplink signals are generally weaker than the central uplink signals. The edge uplink signals are generally weaker due primarily to the longer distance between mobile stations in the edge zone 24b and the satellite 12, and the increased shadowing of mobile stations in the edge zone 24b. Providing diversity reception for the edge uplink signals helps improve the generally lower quality communication links of mobile stations in the edge zone 24b.

Turning to FIG. 2, a more detailed block diagram of mobile-link system 10 is shown. The first mobile-link assembly 16 receives central and edge uplink signals, and includes a receive antenna 30 and a primary receiver 32. Receive antenna 30 converts both central and edge uplink signals to an antenna input that is coupled to primary receiver 32. The primary receiver 32 processes the antenna input from receive antenna 30 and outputs received edge uplink signals and received central uplink signals to feeder-link assembly 20. The primary receiver 32 processes the antenna input to produce the received uplink signals in a conventional manner.

The second mobile-link assembly 18 receives edge uplink signals, and transmits both central and edge downlink signals. The second mobile-link assembly includes a transmit-receive antenna 36, duplexer assembly 38, secondary receiver 40, and mobile-link transmitter 42. To receive edge uplink signals, the transmit-receive antenna 36 converts mobile uplink signals to an antenna input that is fed to duplexer assembly 38. Duplexer assembly 38 directs the antenna input to the secondary receiver 40. The secondary receiver 40 processes the antenna input and outputs received edge uplink signals. The secondary receiver 40 does not output central uplink signals. The received edge uplink signals are output to feeder-link assembly 20.

To transmit mobile downlink signals from second mobile-link assembly 18, mobile-link transmitter 42 outputs central and edge downlink signals to transmit-receive antenna 36 through a direct path 42a and a duplexer path 42b. The transmit-receive antenna 36 outputs central and edge downlink signals to the central zone 24a and edge zone 24b. The mobile downlink signals transmitted by mobile-link assembly 18 correspond to feeder-link uplink signals received at satellite feeder-link assembly 20.

Satellite feeder-link assembly 20 and earth feeder-link assembly 22 communicatively link satellite 12 and earth station 14. The satellite feeder-link assembly 20 conveys mobile uplink signals transmitted by mobile stations and received at satellite 12 to the earth station 14, and receives communication signals from communication devices and communication network 15 that are transmitted by earth feeder-link assembly 22. The satellite feeder-link assembly 20 conveys mobile uplink signals to earth station 14 by transmitting to earth station 14 feeder-link downlink signals, which correspond to the mobile uplink signals. The communication network signals received at satellite feeder-link assembly 20 are conveyed to selected mobile stations in the coverage area 24 by the second mobile-link assembly 18.

The satellite feeder-link assembly 20 generates feeder-link downlink signals by channelizing central and edge uplink signals outputted by mobile-link assemblies 16 and 18. Accordingly, feeder-link downlink signals correspond to the received central uplink signals and received edge uplink signals.

Satellite feeder-link assembly 20 receives communication network signals from earth station 14 by receiving feeder-link uplink signals transmitted from the earth feeder-link assembly 22. The feeder-link uplink signals are used to convey communication network signals from communication devices in the communication network 15 to satellite 12. Satellite feeder-link assembly 34 channelizes the received feeder-link uplink signals and outputs channelized feeder-link uplink signals to mobile-link transmitter 42. The mobile-link transmitter 42 conveys the communication network signals to mobile stations by processing the channelized feeder-link uplink signals and transmitting corresponding mobile downlink signals. Satellite feeder-link assemblies are known in the prior art.

The earth feeder-link assembly 22 of earth station 14 receives feeder-link downlink signals and transmits feeder-link uplink signals. The feeder-link downlink signals are used to convey to earth station 14 mobile uplink signals received at satellite 12. The feeder-link uplink signals are used to convey to satellite 12 the communication network signals from communication network 15.

The earth feeder-link assembly 22 includes a feeder-link antenna 44, duplexer 46, transmitter 48, receiver 50, and a controller/switch 51. Feeder-link antenna 44 converts feeder-link downlink signals to an antenna input. Duplexer 46 then directs the antenna input from feeder-link antenna 44 to receiver 50. Receiver 50 includes a combiner 52 for selectively combining the feeder-link downlink signals. More specifically, the combiner 52 combines the feeder-link downlink signals that correspond to edge uplink signals received from both the first mobile-link assembly 16 and second mobile-link assembly 18 so as to produce resultant diversity signals. The resultant diversity signals correspond to edge uplink signals transmitted by mobile stations in the edge zone 24b. The resultant diversity signals and received feeder-link downlink signals corresponding to central uplink signals are output from receiver 50 to a controller/switch 51. The controller/switch 51 controls the output of outgoing signals, which correspond to mobile uplink signals, to the communication network 15.

Earth feeder-link assembly 22 also transmits feeder-link uplink signals that correspond to communication network signals sent from communication devices in the communication network 15 connected to earth station 14. The communication network signals are designated for mobile stations in the coverage area 24. To transmit feeder-link uplink signals. The controller/switch first receives communication network signals from communication network 15. Next, the controller/switch 51 directs the communication network signals to the feeder-link transmitter 48. The feeder-link transmitter 48 transmits to feeder-link antenna 44 feeder-link uplink signals corresponding to the incoming communication network signals. Feeder-link antenna 44 transmits the feeder-link uplink signals to feeder-link assembly 20 of satellite 12.

Figure 3:
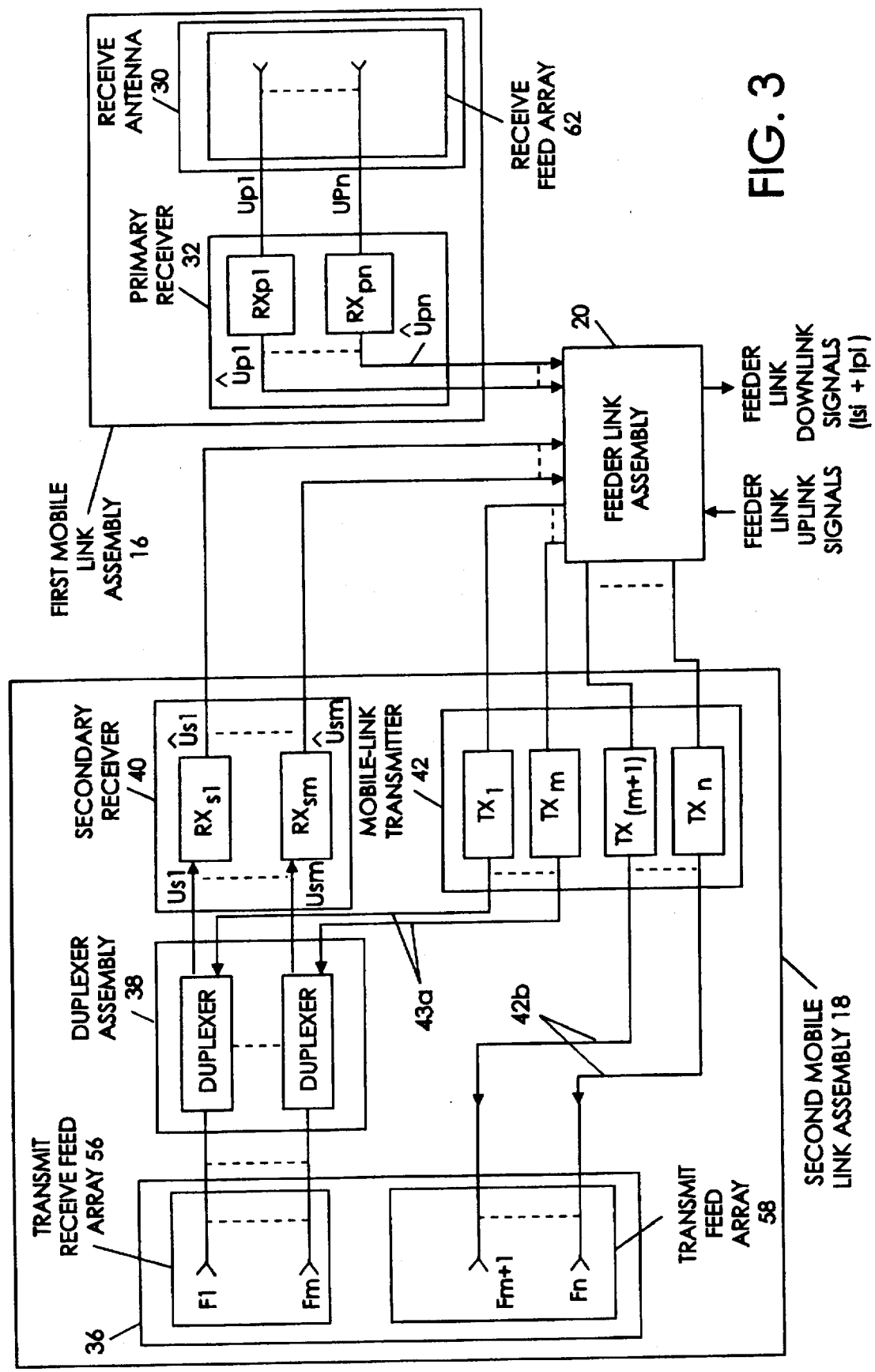
FIG. 3 is a block diagram of the first and second mobile-link assemblies according to a first preferred embodiment of the present invention.

Turning to FIG. 3, a first preferred embodiment of the mobile-link system 10 located in satellite 12 is shown. In the first preferred embodiment, the mobile-link antenna 36 of the second mobile-link assembly is a reflector antenna. The transmit-receive antenna 36 of the first mobile-link assembly includes a transmit-receive feed array 56 and a transmit feed array 58. The transmit-receive feed array 56 has transmit-receive feed elements Fi, where i=1,2, . . . m, and transmit feed array 58 has transmit feed elements Fi, where i=m+1, m+2, . . . n.

The transmit-receive feed elements Fi are configured on antenna 36 to convert only edge uplink signals to antenna input signals and to transmit only edge downlink signals. More specifically, the transmit-receive feed element Fi are located at focal points of edge uplink signals being reflected by the transmit-receive antenna 36 and such that downlink signals transmitted by the transmit-receive feed elements Fi are reflectively directed to the edge zone 24b.

The transmit-receive feed array 56 generates secondary antenna input Usi, where i=1,2, . . . m, and outputs the secondary antenna inputs Usi to secondary receiver 40. The secondary antenna inputs Usi correspond to edge uplink signals and each of the secondary antenna inputs Usi corresponds to an edge uplink signal transmitted by a mobile station in edge zone 24b. Secondary receiver 40 includes a bank of receiver chain Rsi, where i=1,2, . . . m. The receiver chains Rsi receive the secondary antenna input Usi and output received edge uplink signals Ûsi where i=1,2, . . . m. The received edge uplink signals Ûsi are outputted from the second mobile-link assembly 18 to the feeder-link assembly 20. Satellite feeder-link assembly 20 conveys the received edge uplink signals Ûsi to earth station 14. The satellite feeder-link assembly 20 conveys the received edge uplink signals Ûsi by transmitting secondary feeder-link downlink signals Isi, where i=1,2, . . . m, to earth station 14. The secondary feeder-link downlink signals Isi are generated through conventional processing means including channelization.

Transmit feed elements Fi, where i=m+1, m+2, . . . n, of transmit-receive antenna 36 are configured on transmit-receive antenna 36 to transmit central downlink signals to central zone 24a. More specifically, transmit feed elements Fi are located such that signals transmitted by transmit feed elements Fi are reflectively directed to the central zone 24a and not the edge zone 24b. Transmit feed elements Fi are not connected to receive components.

The transmit-receive feed array 56 and the transmit feed array 58 are both connected to mobile-link transmitter 42. Mobile-link transmitter 42 is coupled to feeder-link assembly 20 and generates mobile downlink signals which correspond to feeder-link uplink signals received at feeder-link assembly 20. Mobile-link transmitter 42 includes a bank of transmitter chains Txi, where i=1,2, . . . m, m+1, . . . n. Transmitter chains Tx1 to Tx2 transmits edge downlink signals to transmit-receive feed array 56 through path 42a and duplexer assembly 38. Transmitter chains Tx(m+1) to Txn transmits central downlink signals to receive feed array 58 through path 42b.

Figure 4:
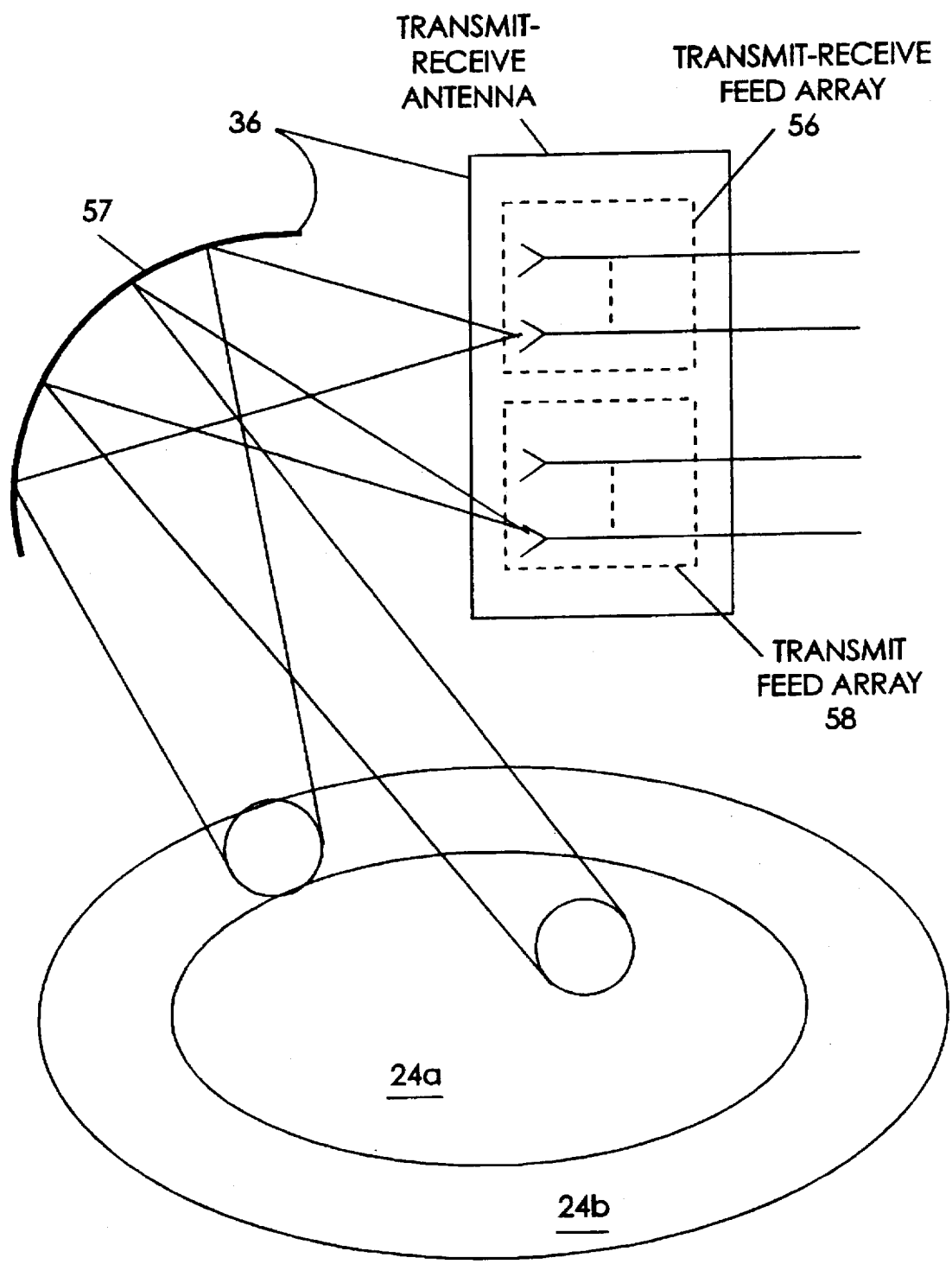
FIG. 4 is a schematic showing representative spot beam coverage of the coverage area by the second mobile-link assembly according to the first preferred embodiment of the present invention.

In FIG. 4, transmit-receive feed array 56, transmit feed array 58, and a reflector 57 of transmit-receive antenna 36 are schematically shown generating representative spot beam for coverage area 24. More specifically, a transmit-receive feed Fi and reflector 57 are shown generating a spot beam in edge zone 24b. Each of the transmit-receive feeds Fi generates a different spot beam in the edge zone 24b so that the transmit-receive feed array 56 provides coverage for the edge zone 24b. Likewise, a transmit feed Fi and reflector 57 are shown generating a spot beam in central zone 24a. Each of the transmit feeds Fi generates a different spot beam in the central zone 24a so that the transmit feed array 58 provides coverage for the central zone 24a.

In the first preferred embodiment of mobile-link system 10, the mobile-link receive antenna 30 of the first mobile-link assembly 16 is also a reflector antenna and has a receive feed array 62. The receive feed assembly 62 has feed elements Fi, where i=1,2, . . . n. The receive feed elements Fi are configured on receive antenna 32 to convert both central and edge uplink signals to antenna inputs Upi, where i=1,2, . . . n. More specifically, the receive feed elements Fi of receive feed assembly 62 are located at focal points of both edge uplink signals and central uplink signals being reflected by the receive antenna 30.

The receive feed assembly 62 of receive antenna 30 generates primary antenna inputs Ûpi, where i=1,2, . . . n, which are outputted to primary receiver 32. The primary antenna inputs Ûpi correspond to both central and edge uplink signals. Each of the primary antenna inputs Upi correspond to either an edge uplink signal transmitted by a mobile station in edge zone 24b or a central uplink signal transmitted by a mobile station in central zone 24a. Primary receiver 32 includes a bank of receiver chains Rpi where i=1,2, . . . n. The receiver chains Rpi receive the antenna inputs Upi and output received uplink signals Ûpi, where i=1,2, . . . n. Received uplink signals Ûpi are fed from the first mobile-link assembly 16 to the satellite feeder-link assembly 20. The satellite feeder-link assembly 20 conveys the received edge uplink signals Upi to earth station 14. Satellite feeder-link assembly 20 conveys the received uplink edge uplink signals Ûpi by transmitting primary feeder-link downlink signals Ipi, where i=1,2, . . . m, to earth station 14. The primary feeder-link downlink signals Ipi are generated through conventional processing means including channelization.

Figure 5:
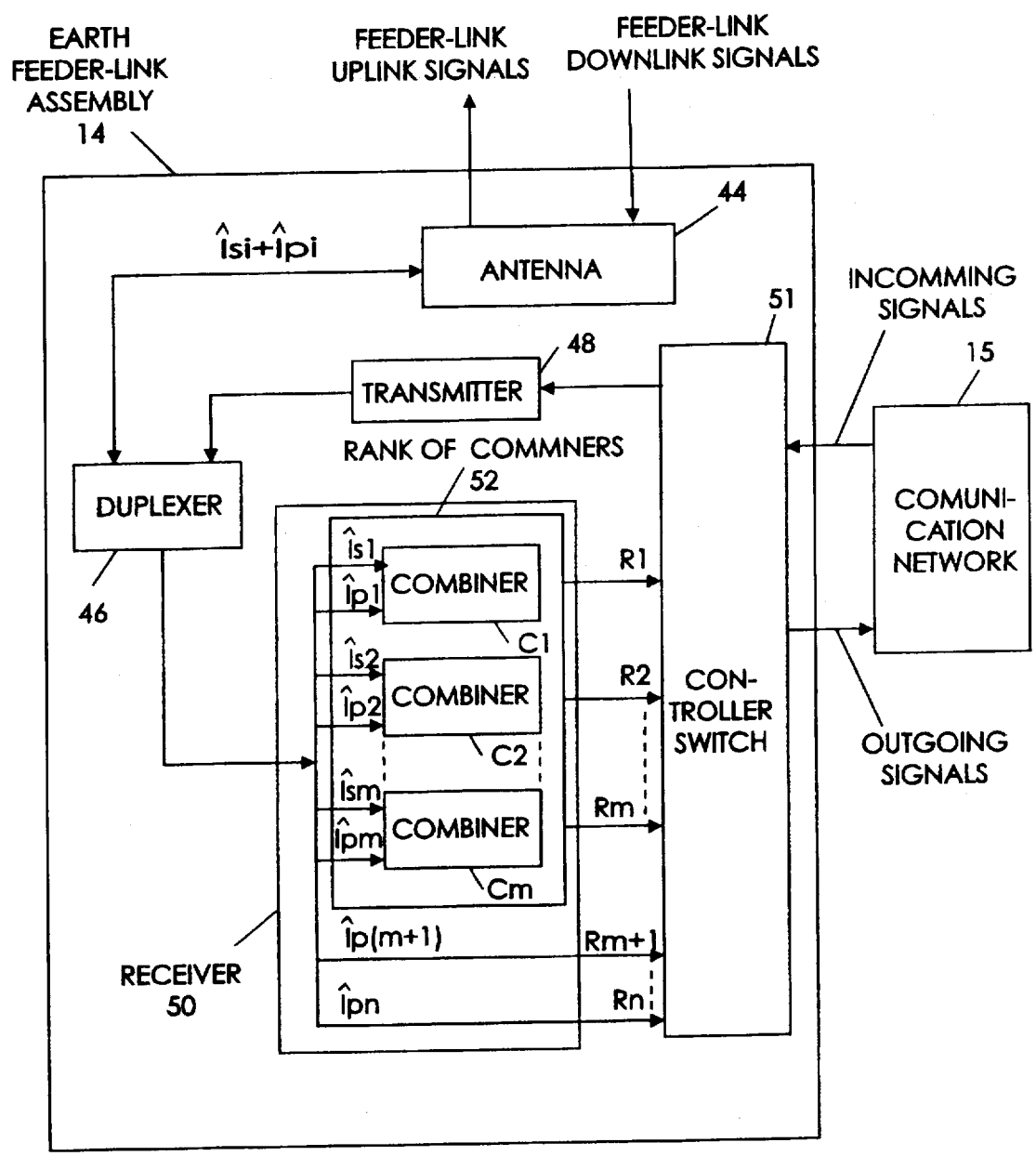
FIG. 5 is a block diagram of the earth station according to the present invention.

Referring to FIG. 5, the feeder-link downlink signals Isi and Ipi are intercepted by feeder-link antenna 44 of earth station 14, and converted to a secondary feeder-link input Îsi and a primary feeder-link input Îpi that is directed to receiver 50 via duplexer 46. The secondary feeder-link input Îsi corresponds to edge uplink signals transmitted by mobile stations in the edge zone. The primary feeder-link input Îpi corresponds to edge uplink signals transmitted by mobile stations in the edge zone and central uplink signals transmitted by mobile stations in the central zone. The primary feeder-link inputs Ipi corresponding to edge uplink signals are represented by inputs Îp1 to Îpm and the primary feeder-link inputs Ipi corresponding to central uplink signals are represented by Îp (m+1) to Îpn.

Receiver 50 receives the feeder-link inputs Îsi and Îpi in a conventional manner. In addition, the receiver 50 diversity combines the secondary feeder-link inputs Îsi with the primary feeder-link inputs Îp1 to Îpm. In the preferred embodiment, receiver 50 includes a combiner bank 52 having combiner Ci, where i=1,2, . . . m, for combining the secondary feeder-link inputs Îsi with the primary feeder-link inputs Îp1 to Îpm. Each of the combiners Ci combines a primary feeder-link input Îpi with a secondary feeder-link input Îsi which correspond to a particular edge uplink signal received at both the first mobile-link assembly 16 and second mobile-link assembly 18. The combiner 51 combines the selected primary and secondary feeder-link inputs using conventional combining processes such as selection combining, maximal ratio and equal gain combining.

Figure 6:
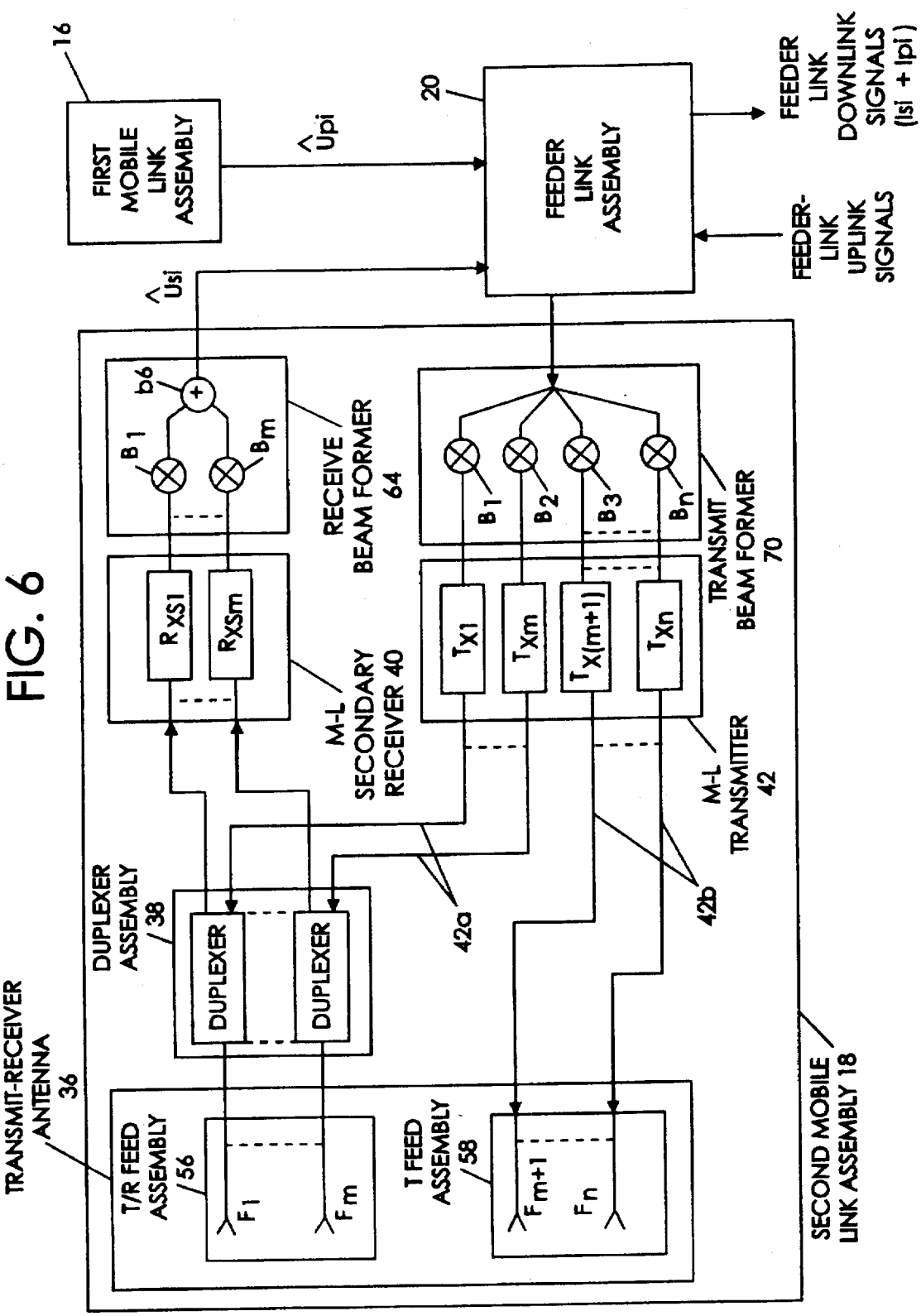
FIG. 6 is a block diagram of the first and second mobile-link assemblies according to a second preferred embodiment of the present invention.

Combiner bank 52 outputs diversity resultant signals Ri where i=1,2, . . . m. The diversity resultant signals correspond to the mobile edge uplink signals transmitted by mobile stations in the edge zone 24b of coverage area 24 and received at the first and second mobile-link assemblies 16 and 18. Receiver 50 also receives primary feeder-link inputs Îp (m+1) to Îpn corresponding to central uplink signals received at the first mobile-link assembly 16, and outputs received feeder-link downlink signals R(m+1) to Rn. The received feeder-link downlink signals R(m+1) to Rn and diversity resultant signals Ri are outputted from the earth feeder-link assembly 22 to controller/switch 51. The controller/switch 51 processes the earth feeder-link assembly output and outputs outgoing communication network information to communication network 15. The outgoing communication network information corresponds to mobile uplink signals initially transmitted from mobile stations in coverage area Turning to FIG. 6, a second preferred embodiment of mobile-link system 10 located in satellite 12 is shown. The second preferred embodiment is different from the first preferred embodiment of mobile-link system 10 in that transmit-receive antenna 36 of the second mobile-link assembly is a direct array antenna. In the second preferred embodiment, the second mobile-link assembly 18 outputs received edge uplink signals transmitted from mobile stations in the edge zone 24b as follows. Transmit-receive feed array 56 of transmit-receive antenna 36 receives edge and central uplink signals from mobile stations in the edge zone 24b and central zone 24a, and generates secondary antenna inputs Usi, where i=1,2, . . . m. The secondary antenna inputs Usi is fed to secondary receiver 40 through duplexer 38. Secondary receiver 40 processes the antenna inputs Usi in a conventional manner and outputs receiver output signals Usi' to a receive beam former 64. Receive beam former 64 includes beam weights Bi, where i=1,2, . . . m, for modifying each of the receiver output signals Usi'. The beam weights Bi are selected so that central uplink signals received at the transmit-receive antenna 36 are canceled out after passing through receive beam former 64. The beam weights Bi are multiplied with the receiver output signals Usi' to produce received edge uplink signals Ûi that are outputted from second mobile-link assembly 18. The receive beam former 64 includes an adder 66 for summing the received edge uplink signals prior to outputting the secondary receiver signals Usi' to feeder-link assembly 20.

In the second preferred embodiment, the second mobile-link assembly 18 transmits central and edge downlink signals to mobile stations in the central zone 24a and edge zone 24b as follows. Feeder-link uplink signals, after processing including channelization, are outputted from the satellite feeder-link assembly 20 to a transmit beam former 70 having beam weights Bi, where i=1,2, . . . n. Transmit beam former 70 multiplies the channelized feeder-link uplink signals with beam weights Bi. The beam weights of the transmit beam former 70 are selected so that beam signals for producing spot beams for coverage area 24 are generated. The beam signals are passed through mobile-link transmitter 42, duplexer assembly 38, and antenna 36 as shown to produce spot beams for coverage area 24.

The mobile-link system 10 of the present invention includes first and second mobile-link assemblies 16 and 18 that together provide for transmission of mobile downlink signals and reception of mobile uplink signals for both a first and second zone of a coverage area, and that provide diversity reception for the second zone in the coverage area. In the preferred embodiments, the second zone is an edge zone, but other zones within the coverage area that would particularly benefit from diversity reception can be selected for the second zone. The mobile-link system 10 eliminates the need for providing an additional mobile-link assembly used for diversity reception of mobile uplink signals. In addition, by providing diversity reception for only the second zone, the components required for satellite 12 and weight of satellite 12 is minimized. Likewise, by locating the combiner 52 in the earth feeder-link assembly 22, the components required for satellite 12 and weight of satellite 12 is minimized. Accordingly, the mobile-link system 10 of the present invention helps minimize the complexity and weight of satellite 12.

It will be appreciated by those of ordinary skill in the art that the present invention can be embodied in other specific forms without departing from the spirit or essential character thereof. The presently disclosed embodiments are therefore considered in all respects to be illustrative and not restrictive.

What is claimed is:

1. A mobile-link system for a radio communication system comprising:
   a) a first mobile-link assembly having a first antenna coupled to a first receiver for receiving mobile uplink signals including central uplink signals transmitted from mobile stations located in a central zone of a coverage area and edge uplink signals transmitted from mobile stations located in an edge zone of said coverage area where said edge zone borders said central zone, and said receiver outputting central uplink signals and edge uplink signals;
   b) a second mobile-link assembly having a second antenna coupled to a second receiver for receiving mobile uplink signals transmitted from mobile stations in said coverage area, said second antenna and second receiver outputting edge uplink signals transmitted by mobile stations located in said edge zone and not outputting central uplink signals transmitted by mobile stations located in said central zone, and said second mobile-link assembly for transmitting mobile downlink signals to at least said central and edge zones of said coverage area;
   c) a combiner for diversity combining said edge uplink signals outputted by both said first receiver and said second receiver so as to produce diversity resultant signals corresponding to edge uplink signals received at said first and second mobile-link assemblies; and
   d) wherein said first mobile-link assembly, second mobile-link assembly, and combiner predeterminedly provide diversity reception for mobile stations in said edge zone and not provide diversity reception for mobile stations in said central zone.

2. The mobile-link system of claim 1, wherein said second antenna includes:
   transmit-receive feeds for transmitting mobile downlink signals and receiving mobile uplink signals, and transmit feeds for transmitting mobile downlink signals; and wherein said second receiver processes mobile uplink signals received by said transmit-receive feeds; and wherein said second mobile-link assembly further includes:
   a) a mobile-link transmitter for outputting mobile downlink signals to said transmit-receive feeds and transmit feeds of said second antenna for transmission of mobile downlink signals to mobile stations in said central zone and said edge zone; and
   b) a duplexer assembly coupled to said secondary receiver, mobile-link transmitter, and transmit-receiver antenna for directing received uplink signals from said transmit-receive feeds to said second receiver and for directing mobile downlink signals from said mobile-link transmitter to said transmit-receive feeds.

3. The mobile-link system of claim 2, wherein, the first mobile-link assembly includes:
   a) a first antenna for receiving central and edge uplink signals;
   b) a first receiver for processing central and edge uplink signals received by said first antenna.

4. The mobile-link assembly of claim 3, wherein the first and second mobile-link assemblies are located in a satellite and coupled to a satellite feeder-link assembly, said satellite feeder-link assembly for conveying said received mobile uplink signals outputted from said mobile-link assemblies to an earth station.

5. The mobile-link system of claim 4, wherein said satellite feeder-link assembly conveys said received uplink signals to said earth station by transmitting feeder-link downlink signals to said earth station.

6. The mobile-link system of claim 5, wherein said combiner is located in said earth station and combines said feeder-link downlink signals received at said earth station so as to produce said diversity resultant signals corresponding to edge uplink signals received at said first and second mobile-link assemblies.

7. The mobile-link system of claim 1, wherein said second antenna of said second mobile-link assembly is a reflector antenna, and wherein said second mobile-link assembly receives edge uplink signals transmitted from mobile stations in said edge zone and does not receive central uplink signals transmitted from mobile stations in said central zone.

8. The mobile-link system in claim 2, wherein said second antenna of said second mobile-link assembly is a reflector antenna, and wherein said second mobile-link assembly receives edge uplink signals transmitted from mobile stations in said edge zone and does not receive central uplink signals transmitted from mobile stations in said central zone.

9. The mobile-link system of claim 8, wherein said transmit-receive feeds of said second antenna receives edge uplink signals transmitted from mobile stations in said edge zone and does not receive central uplink signals transmitted from mobile stations in said central zone.

10. The mobile-link system of claim 8, wherein said mobile-link transmitter transmits central downlink signals to said transmit feeds of said second antenna and edge downlink signals to said transmit-receive feeds of said second antenna.

11. The mobile-link system of claim 10, wherein said duplexer assembly directs edge uplink signals from said transmit-receive feeds of said second antenna to said second receiver and directs edge downlink signals to said transmit-receive feeds of said second antenna.

12. The mobile-link system of claim 1, wherein said second antenna of said second mobile-link assembly is a direct array antenna, wherein said second antenna receives the central and edge uplink signals, and wherein said second mobile-link combining step includes combining feeder-link down link signals at said earth station so as to produce said diversity resultant signals corresponding to edge uplink signals received at said first and second mobile-link assemblies.

13. The mobile-link system of claim 2, wherein said transmit-receive antenna of said second mobile-link assembly is a direct array antenna, wherein said transmit-receive antenna receives the zone-one and zone-two uplink signals, and wherein said second mobile-link assembly processes said received uplink signals so as to output received zone-two uplink signals.

14. The mobile-link system of claim 13, wherein said second receiver includes a receive beam former for multiplying received uplink signals from said transmit-receive feeds with predetermined beam forming weights so as to output zone-two uplink signals from said second mobile-link assembly.

15. The mobile-link system of claim 14, wherein said mobile-link transmitter includes a transmit beam former for forming downlink signals to be transmitted through said transmit-receive feed array and transmit feed array of said transmit-receive antenna.

16. A method of linking a mobile-link system for a radio communication system with mobile stations, comprising:
 a) receiving at a first mobile link assembly having a first antenna coupled to a first receiver mobile uplink signals including central uplink signals transmitted from mobile stations located in a central zone of a coverage area and edge uplink signals transmitted from mobile stations located in an edge zone of said coverage area where said edge zone borders said central zone;
 b) outputting from said first receiver central uplink signals and edge uplink signals;
 c) receiving at a second mobile-link assembly having a second antenna coupled to a second receiver mobile uplink signals transmitted from mobile stations in said coverage area;
 d) outputting from said second receiver edge uplink signals transmitted by mobile stations located in said edge zone and not central uplink signals;
 e) transmitting from said second mobile-link assembly mobile downlink signals to at least said central and edge zones of said coverage area;
 f) diversity combining said edge uplink signals outputted by said first receiver and said second receiver so as to produce diversity resultant signals corresponding to edge uplink signals received at said first and second mobile-link assemblies; and
 g) wherein diversity reception is predeterminedly provided for mobile stations in said edge zone and not provided for mobile stations in said central zone.

17. The method of claim 16, wherein the first and second mobile-link assemblies are located in a satellite and coupled to a satellite feeder-link assembly, and further including the step of conveying received mobile uplink signals outputted from said mobile-link assemblies to an earth station.

18. The method of claim 16, wherein said step of conveying received mobile uplink signals to an earth station includes transmitting feeder-link downlink signals from said satellite feeder-link assembly to said earth station.

19. The method of claim 16, wherein said diversity combining step includes combining feeder-link downlink signals at said earth station so as to produce said diversity resultant signals corresponding to zone-two uplink signals received at said first and second mobile-link assemblies.

20. The method of claim 16, wherein said step of receiving mobile uplink signals at said second mobile-link assembly includes receiving with a reflector antenna edge uplink signals transmitted from mobile stations in said edge zone and not receiving central uplink signals transmitted from mobile stations in said central zone.

21. The method of claim 16, wherein said step of receiving mobile uplink signals at said second mobile-link assembly includes receiving with a direct array antenna central and edge uplink signals transmitted from mobile stations in said central zone and said edge zone, and processing said received central and edge uplink signals so as to output from said second mobile-link assembly received edge uplink signals.

* * * * *